United States Patent [19]

Isshiki et al.

[11] 4,355,301
[45] Oct. 19, 1982

[54] OPTICAL CHARACTER READING SYSTEM

[75] Inventors: Isao Isshiki; Akihiro Ohoka; Fukuma Sakamoto; Masatoshi Tanaka; Koji Sato, all of Osaka, Japan

[73] Assignee: Sumitomo Electric Industries, Ltd., Osaka, Japan

[21] Appl. No.: 153,222

[22] Filed: May 27, 1980

[51] Int. Cl.³ .............................................. G06K 9/00
[52] U.S. Cl. ............................................. 340/146.3 D
[58] Field of Search .......... 340/146.3 ED, 146.3 AC, 340/146.3 AQ, 146.3 Q, 146.3 D, 146.3 F, 146.3 MA, 146.3 SY; 235/462, 472; 358/285; 250/567

[56] References Cited

U.S. PATENT DOCUMENTS

| | | | |
|---|---|---|---|
| 3,381,274 | 4/1968 | Quade et al. | 340/146.3 D |
| 3,503,043 | 3/1970 | Brass | 340/146.3 D |
| 3,728,677 | 4/1973 | Munson | 340/146.3 F |
| 3,764,978 | 10/1973 | Tyburski et al. | 340/146.3 ED |
| 3,764,980 | 10/1973 | Dansac et al. | 340/146.3 ED |
| 3,832,682 | 8/1974 | Brok et al. | 340/146.3 ED |
| 3,895,350 | 7/1975 | DeVries | 340/146.3 D |
| 3,938,089 | 2/1976 | McGregor et al. | 340/146.3 D |
| 3,947,817 | 3/1976 | Requa | 235/472 |
| 3,949,363 | 4/1976 | Holm | 235/462 |
| 3,976,973 | 8/1976 | Martin et al. | 340/146.3 MA |
| 4,032,887 | 6/1977 | Roberts | 340/146.3 ED |
| 4,048,617 | 9/1977 | Neff | 340/146.3 SY |
| 4,096,472 | 6/1978 | Mercier | 340/146.3 ED |
| 4,180,800 | 12/1979 | Isshiki et al. | 340/146.3 MA |

Primary Examiner—Leo H. Boudreau
Attorney, Agent, or Firm—Sughrue, Mion, Zinn, Macpeak & Seas

[57] ABSTRACT

An optical character reading system in which each character pattern is electronically scanned several times while a manually held scanner is moved over the character pattern. The recognition results from each scan are subjected to a selection process and a final signal recognition result is generated in which noise and inaccurate recognition results have been substantially eliminated. Data from a character scanner is classified into several different data types from which partial characteristics are determined. Signals representing the partial characteristics operate a memory circuit which produces the final recognition signal.

10 Claims, 16 Drawing Figures

☒ BLACK
☐ WHITE

FIG. 2

☒ BLACK "1"
☐ WHITE "0"

Di1 : FIRST RECOGNITION RESULT
Di2 : SECOND RECOGNITION RESULT
Di3 : THIRD RECOGNITION RESULT

FIG. 12

OPTICAL CHARACTER READING SYSTEM

BACKGROUND OF THE INVENTION

The present invention relates to character reading systems. More particularly, the invention relates to an optical character reading system in which characters on a sheet are manually scanned and the characters thus scanned are optically read.

In a conventional character and symbol reading device, hereinafter referred to merely as "an OCR", in which characters, symbols or the like, hereinafter referred to simply as character patterns, are read by manually moving a scanner or observation system and character areas in both vertical and horizontal directions are detected. When a character reaches a predetermined position on the scanner, the character is recognized and an appropriate recognition output signal is generated.

However, it should be noted that, in the above-described device, there is usually only one predetermined position at which the character can be recognized. Therefore, if there is a great deal of noise at that position, it is likely that the character cannot be accurately read.

SUMMARY OF THE INVENTION

Accordingly, an object of the invention is to eliminate the above-described difficulty. In an optical character reading system according to the invention, a character is recognized at a plurality of different positions and a collective determination of the character is made. As a result, the effect of noise is minimized and the performance of the system is considerably improved.

DESCRIPTION OF THE PREFERRED EMBODIMENTS

Figure 1:
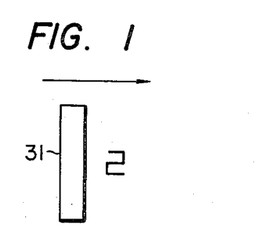
FIG. 1 is an explanatory diagram showing a character scanned by a scanner.
Figure 2:
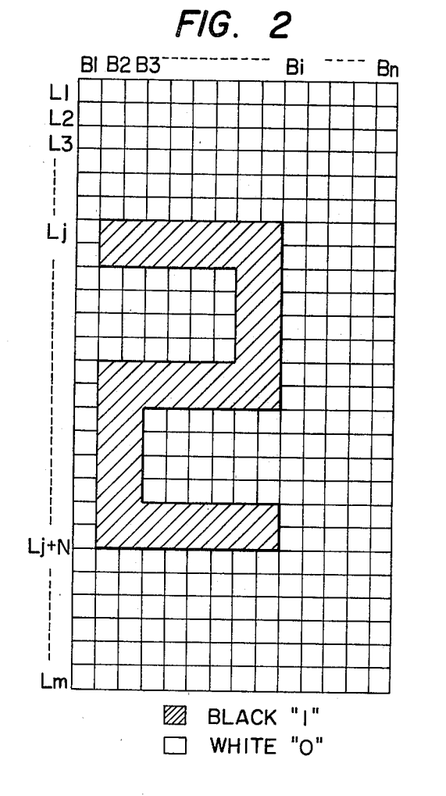
FIG. 2 is a diagram showing the image of a character formed on a sensor.

Referring first to FIGS. 1 and 2, for the case where the character "2", for instance, is scanned with a scanner 31 including an optical system and a sensor composed of photoelectric conversion elements, such as photodiode arrays arranged either two-dimensionally in an (m×n) matrix or in a plane as shown in FIG. 1, a character image as shown in FIG. 2 (hereinafter referred to as "a frame" when applicable) is scanned by the sensor and the various parts thereof are binary-coded as "white" or "black" areas. In general, when the sensor is moved through predetermined positions, such as when all of the column B1 from $L_1$ to $L_m$ are white and a part of the column B2 is black as shown in FIG. 2, the character within the scanning frame is recognized only once to provide a single recognition output.

Figure 3:
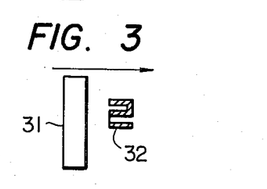
FIG. 3 is an explanatory diagram showing a fragmented character scanned by the scanner.
Figure 4:
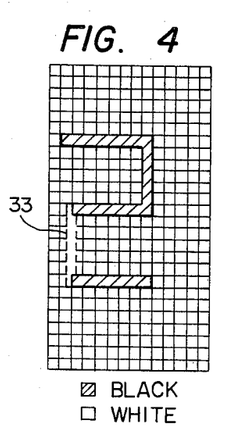
FIG. 4 is an explanatory diagram illustrating the image of a thin character formed on the sensor.

As the resolution of the sensor is limited by the number of photoelectric conversion elements in the sensor, the maximum resolution obtainable is of the order of the width of a stroke forming a character. Therefore, if for example, a part of the character "2" is very thin as shown in FIG. 3, the effect is the image shown in FIG. 4 for which the white/black determination threshold value is only half that of a properly formed character. If the stroke of character 32 corresponds to two columns or two lines of the sensor, both columns or lines of the sensor may be determined as "white". If the segment 32 is determined as "white", then it is determined that a part of the character is void and therefore the character cannot be correctly recognized. The invention as will be described, eliminates the above-described difficulty and minimizes the effects of noise.

In FIG. 3, when the character is read by manually moving the scanner 31, the scanning speed of the sensor is much higher than the moving speed of the scanner 31. Therefore, there is sufficient time available for the scanning to be repeatedly carried out while the scanner 31 passes over a single character.

Figure 5A:
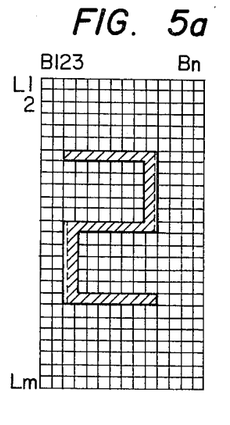
FIGS. 5a–5c is an explanatory diagram for a description of the variations of a frame formed on the sensor.
Figure 5B:
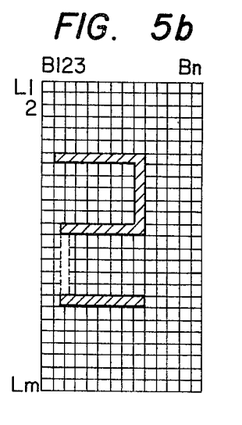
Figure 5C:
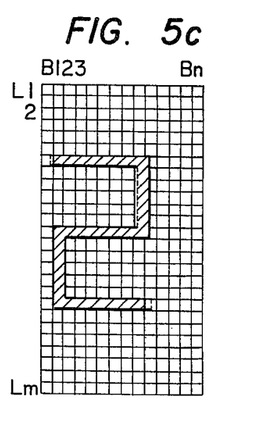

FIGS. 5a–5c show three different parts of a scanned frame. In accordance with the present invention, a plurality of predetermined positions are provided and each character is recognized, for instance, at positions shown in each of FIGS. 5a–5c. This permits the character to be determined collectively and a corresponding determination result to be generated. Therefore, even if the character cannot be recognized at the position shown in FIG. 5b, which is substantially the same as that of FIG. 4, it can be recognized at the positions shown in FIGS. 5a and 5c. Thus, the performance of the device is considerably improved.

Figure 6:
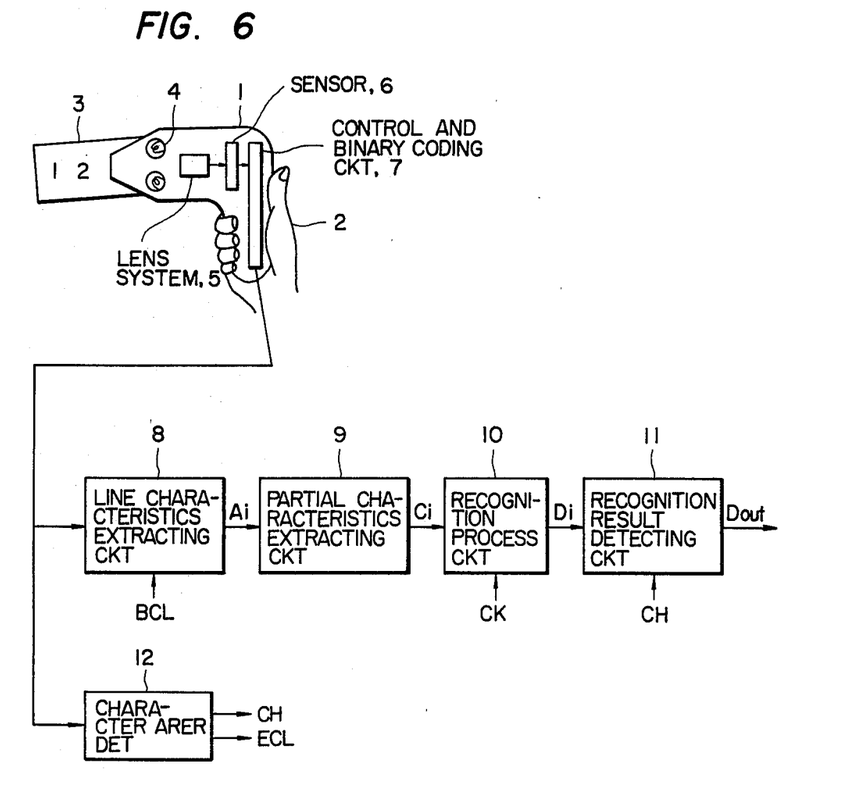
FIG. 6 is an explanatory diagram, partly as a block diagram, showing a preferred embodiment of the invention.
Figure 12:
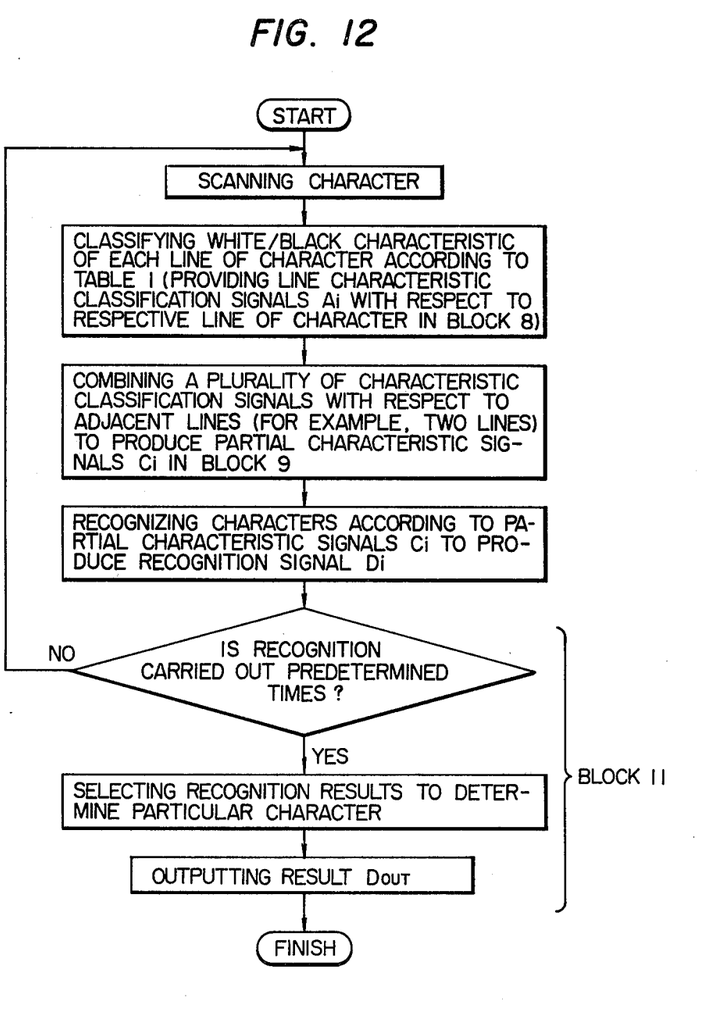
FIG. 12 is a flow chart describing the operation of the circuits shown in FIG. 6.

FIG. 6 is an explanatory diagram, partly as a block diagram, showing an apparatus for practicing the optical character reading system according to the invention. The operations of the circuits shown in FIG. 6 are described in the flow chart of FIG. 12. In the apparatus shown in FIG. 6, characters are recognized by manually moving a scanner 1 horizontally over a sheet 3 on which the characters have been printed. The sheet 3 is irradiated by lamps 4 so that the image of a character pattern on the sheet 3 is formed on a sensor 6 composed of photoelectric conversion elements arranged two-dimensionally or on a plane by means of a lens system 5. Light reflected from the background of the sheet 3 is different in intensity from light reflected from the character regions. Therefore, the output signals of the photoelectric conversion elements which receive the different light levels are subjected to level decisions. That is, digital outputs are generated which correspond to "white" and "black" by a control and binary-coding circuit 7. For instance, a signal corresponding to the background of the sheet 3 or "white" is represented as a logical "0" level and the signal corresponding to a character region or "black" is represented as a logical "1" level. The construction and operation of the lens system 5, sensor 6 and control and binary-coding circuit 7 are generally well-known in the art.

Hereinafter, the photoelectric conversion elements of the sensor 6 will be referred to as "cells" in the following description. For this description, it is assumed that the image of the character pattern on the sheet 3 is as shown in FIG. 2 and that, accordingly, FIG. 2 shows the relationship between the cells of the sensor 6 and the binary coded signals generated by the control and binary-coding circuit 7. Hereinafter, a single pattern formed by (n×m) cells will be referred to as "a frame".

The control and binary-coding circuit 7 produces signals corresponding to each of the columns $B_1$, $B_2$, ... and $B_n$ in the uppermost line $L_1$ in the stated order following which it produces signals corresponding to the columns $B_1$ through $B_n$ in the second line $L_2$, signals corresponding to the columns $B_1$ through $B_n$ in the third line $L_3$ and so forth up to signals corresponding to the columns $B_1$ through $B_n$ in the lowermost line $L_m$ thus accomplishing the scanning of one frame.

In accordance with the invention, a character area detecting circuit 12 operates to detect the presence of a character area in the frame being scanned, that is, the circuit 12 operates to detect whether a character is within a frame or not. If a character is detected within a frame, then the circuit 12 operates upon the cells corresponding to the left and right ends of the character and in response produces a signal BCL. Also, the circuit 12 detects whether or not the sensor 6 has scanned the next character and, in response to this detection, produces a signal CH. If all the cells $L_1$ through $L_m$ in the column $B_1$ are "white", then it is determined that the character scanned lies entirely within the frame. If one or more of the cells $L_1$ through $L_m$ in the column $B_1$ is "black" then it is determined that the sensor has scanned portions of the next character. Furthermore, the vertical direction, in FIG. 2, the character area running from the line $L_j$, of the character is detected.

A technique for detecting the character area in horizontal and vertical directions is used with the invention in which a determination is made as continuous black cells are present in horizontal and vertical direction. A line characteristic extracting circuit 8 operates to extract the characteristics of white/black data in one line in a character area and to classify this data into a plurality of data types. Table 1 shows an example of this type of classification. In the frame shown in FIG. 2, the character area falls within the area from the line $L_j$ to the line $L_{j+N}$ in the vertical direction and from the column B1 to the column Bi in the horizontal direction. Thus, to detect the character, the characteristics of the columns $B_1$ through $B_i$ in the line $L_j$ are extracted and classified after which the same operation is performed on the columns B1 through Bi in the line $L_{j+1}$. Furthermore, the characteristics of the area up to the line $L_{j+N}$ are extracted and classified.

Figure 7A:
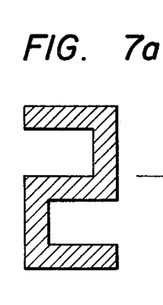
FIGS. 7a–7c shows an example of a characteristic classification.
Figure 7B:
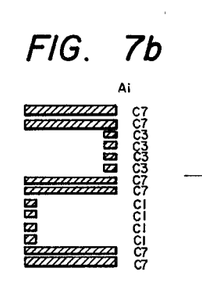

FIG. 7b shows an example of a case where the characteristics of the lines in the frame in FIG. 2 are extracted and classified according to Table 1. A partial characteristics extracting circuit 9 operates to combine for a plurality of lines the characteristics classification signals $A_i$ which are provided respectively for each line by the line characteristic extracting circuit 8 and to classify the characteristics which are newly provided by the combination into a plurality of different types hereinafter referred to as "partial characteristics Ci". This operation is used to carry out data compression in order to simplify the following recognition process but is not always necessary.

In the described embodiment of the invention, the classification process is carried out on the characteristics classification signals Ai for lines adjacent to each line to provide the partial characteristics signal Ci.

TABLE 1

| Classification | Diagram | Description |
|---|---|---|
| $C_0$ | | No segment |
| $C_1$ | ▨ | Vertical segment in the left part of a character |
| $C_2$ | ▨ | Vertical segment in the central part of the character |
| $C_3$ | ▨ | Vertical segment in the right part of the character |
| $C_4$ | ▨  ▨ | Two vertical segments |
| $C_5$ | ▨▨ ▨▨ | A part of a horizontal segment in the left part of the character |
| $C_6$ | ▨▨ ▨▨ | A part of a horizontal segment in the right part of the character |
| $C_7$ | ▨▨▨▨ | Horizontal segment |

Figure 7C:
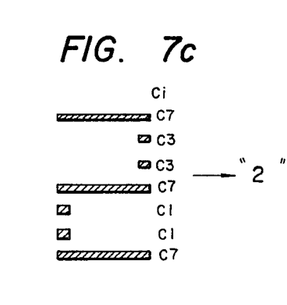

For carrying out the characteristics classification for every other line, the characteristic signal $A_i$ of one of the two lines is selected, depending on the characteristics of the upper and lower lines, to provide its partial characteristic signal $C_i$. By way of example, the partial characteristic signals $C_i$ shown in FIG. 7c are extracted from the line characteristic signals Ai in FIG. 7b.

Figure 9:
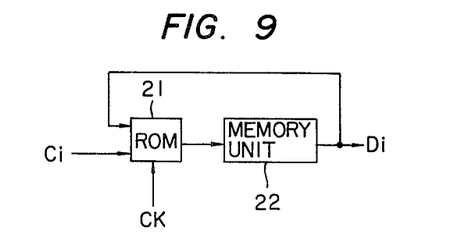
FIG. 9 is a block diagram showing the arrangement of the recognition process circuit.

A recognition process circuit 10, as shown in FIG. 9, includes a read-only memory 21 and a memory unit 22. The partial characteristic signal $C_i$ is inputted to the circuit 10 by a timing signal CK and the content of an address defined by the partial characteristic signal $C_i$ and the corresponding content of the memory unit 22 is read out of the read-only memory 21 and is then stored in the memory unit 22. The content of the memory unit 22 provided when all of the partial characteristic signals Ci have been inputted, corresponds to the recognition result which is outputted as a recognition result $D_i$.

Figure 8:
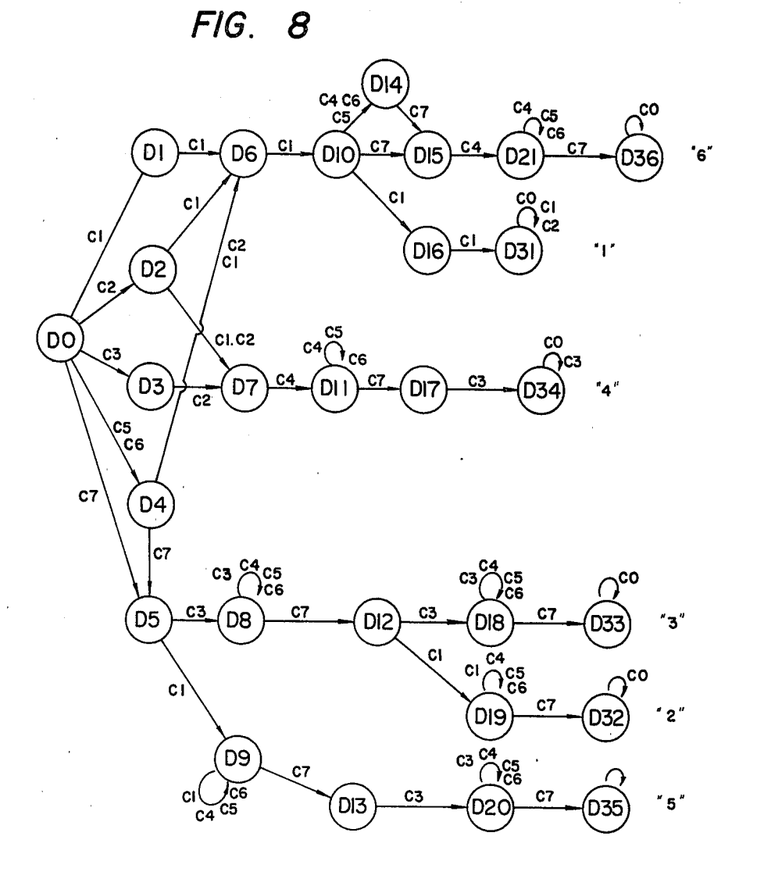
FIG. 8 is an explanatory diagram for a description of the operation of a recognition process circuit in FIG. 6.

FIG. 8 is an explanatory diagram provided for the recognition process circuit 10. In FIG. 8, reference character $D_0$ designates the initial condition while reference characters $D_{31}$ through $D_{36}$ designate the recognition results of the numerals "1" through "6", respectively. When the partial characteristic signals $C_7$, $C_3$, $C_3$, $C_7$, $C_1$, $C_1$ and $C_7$ are extracted in the stated order as shown in FIG. 7c, the corresponding conditions are proceeded through as $D_0$, $D_5$, $D_8$, $D_8$, $D_{12}$, $D_{19}$, $D_{19}$ and $D_{32}$ in the stated order in FIG. 8. Since the last condition $D_{32}$ corresponds to the numeral "2", the numeral "2" is outputted as the recognition result. This signal is applied to a recognition result selecting circuit 11.

Similarly, the recognition process is carried out in the same manner in the next frame scanning operation and the result $D_i$ is applied to the recognition result selecting circuit 11. For instance, in the case where the frames shown in FIGS. 5a–5c are scanned one after another, the respective recognition result signals are applied to the recognition result selecting circuit 11.

Upon reception of a character scan completion signal CH, the recognition result selecting circuit 10 subjects a plurality of results $D_i$ inputted by the recognition process circuit 10 to a selection process and outputs a signal "Dout" as the final single character recognition result.

In one example of an appropriate selection process, a character which is most frequently recognized among a plurality of characters is outputted as the signal "Dout". In another example of the selection process, a character which has been recognized more than a predetermined number of times is outputted as the signal "Dout". For instance, even if, recognition results $D_i$ of the frames shown in FIGS. 5a–5c are inputted and a recognition result $D_i$ which cannot be recognized as the numeral "2" as in FIG. 5b is included therein, the character can nonetheless be recognized as the numeral "2" from the recognition results $D_i$ of the frames in FIGS. 5a and 5c. Thus, the optical character reading system according to the invention is very high in its reading performance.

Figure 10:
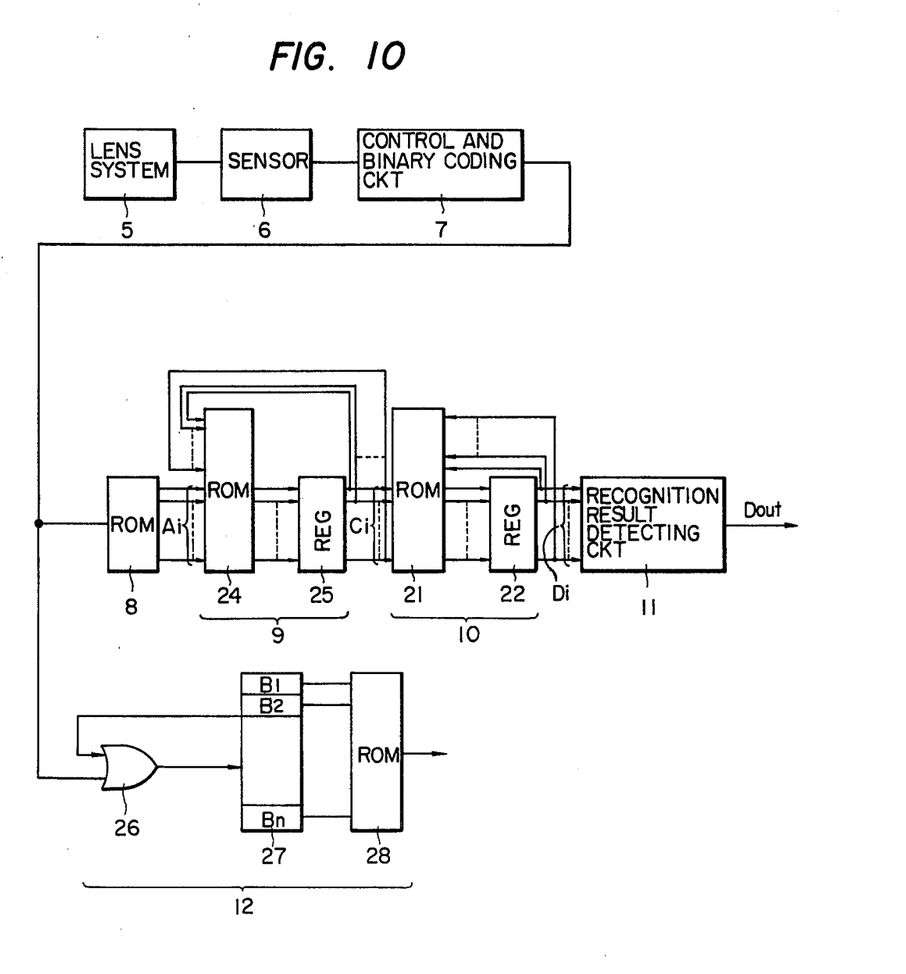
FIG. 10 is a detailed schematic diagram of the circuit shown in FIG. 6.

The circuits 8–10 shown in FIG. 6 each have a similar circuit construction. More specifically, as shown in FIG. 10, the recognition process circuit 10 includes a read-only memory 21 and a memory circuit 22 which may be a simple register or latch. For the read-only memory, an Intel Company type B-2716 integrated circuit or a Texas Instruments Company type 2516 or 2532 integrated circuit may be employed. A Texas Instruments Company type 74Ls 273 integrated circuit may be used for the memory circuit.

The binary output train of the binary recording circuit 7, which represents the data of each line $L_j$ to $L_{j+N}$, is applied to the line characteristics extracting circuit 8 as the address of the read-only memory. The content of the read-only memory at the designated address is read out as the output signal $A_i$ which is then applied as a part of the address to read-only memory 24 of partial characteristics extracting circuit 9. The contents read out from read-only memory 24 are transferred to a register 25. The outputs of register 25 form the signal $C_i$. The outputs of register 25 are also fed back to address inputs of the read-only memory 24 which together with the signal $A_i$ from the read-only memory 8, form the composite address to read-only memory 24. In this fashion, the composite address to the read-only memory 24 is made up of the $A_i$ data representing the current line of the character as it is processed while the $C_i$ data is representative of the previously-processed line of the same character. This permits the recognition process to be carried out utilizing the data from every other line as described above. The output signal $C_i$ from register 25 is applied as a portion of the address input to read-only memory 21 of the recognition process circuit 10. Similar to the partial characteristics extracting circuit 9, the recognition process circuit 10 includes the read-only memory 21 and a register 22 which receives the outputs of read-only memory 21. The operation of the recognition process circuit 10 is otherwise similar to that of the partial characteristics extracting circuit 9.

Figure 11:
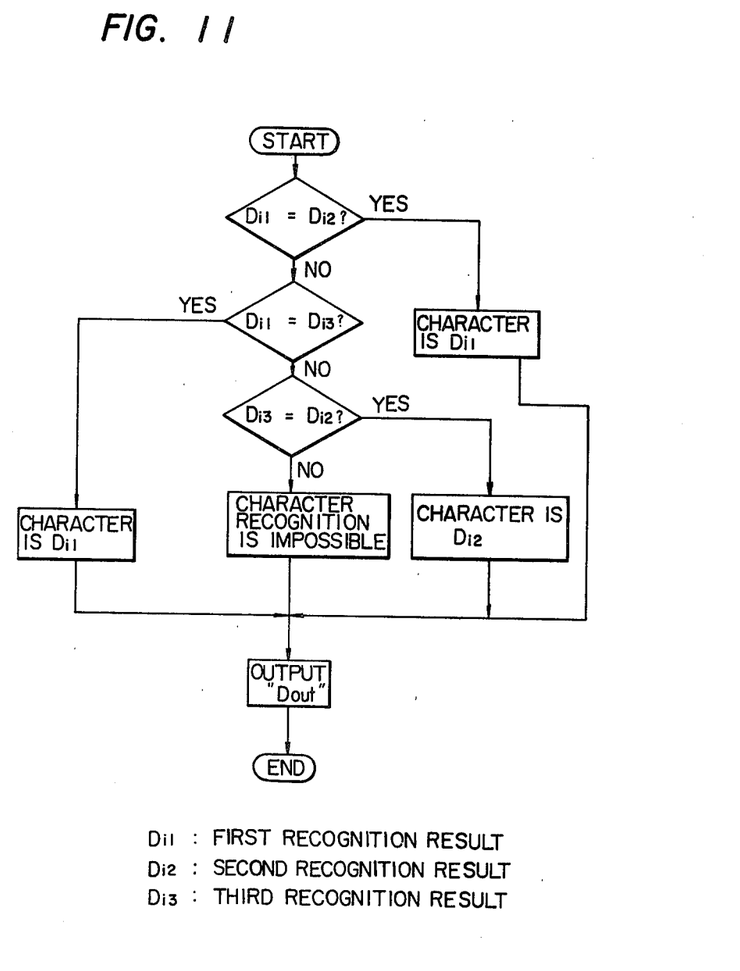
FIG. 11 is a flow chart describing the operation of the microprocessor used in the circuit shown in FIG. 10.

The recognition results detecting circuit 11 is preferably constituted by a microprocessor, for example, an Intel Company type 8748. As described previously, the scanning operation is carried out repeatedly while the scanner 31 passes over a single character. The plural recognition results $D_i$ for a single character are outputted from the recognition process circuit 10 to inputs of the recognition results detecting circuit 11 wherein the plural results $D_i$ are subjected to a selection process, also as described above, to thereby obtain a final output signal $D_{out}$ as the final character recognition result. A flow chart describing the operation of the microprocessor which constitutes the recognition results detecting circuit 11 is shown in FIG. 11. The flow chart may be implemented by any one of a number of well-known and widely available software techniques depending upon the particular microprocessor chosen.

The character area detector 12 operates to detect whether "black" exists in the cells $L_1$ through $L_m$ in the first column $B_1$. A similar operation is successively carried out for the remaining columns $B_2$ through $B_n$. The character area detector 12 is constituted by plural OR gates 26, a register 27 and a read-only memory 28. In the circuit, the outputs of the control and binary-coding circuit 7 and the register 27 are subjected to a logical summation process for each of the lines $L_1$ through $L_n$. After the sum is formed and re-clocked into the register 27, the output of the register 27 is coupled to the address inputs of the read-only memory 28 to thereby read out the corresponding contents stored therein.

What is claimed is:

1. An optical character reading system comprising: means for optically scanning a two-dimensional character pattern by a single sensor in a single sweep of said sensor past said character pattern for optically recognizing said character pattern at a plurality of different relative positions between said single sensor and said character pattern to provide a plurality of recognition results; and means for subjecting said plurality of recognition results to selection to provide a final single recognition result of said character pattern.

2. The optical character reading system of claim 1 wherein said means for subjecting said plurality of recognition results to selection comprises means for providing said final single recognition result as the character most frequently recognized along a predetermined number of character output signals.

3. The optical character reading system of claim 1 wherein said means for subjecting said plurality of recognition results to selection comprises means for providing said final single recognition result in response to the recognition of a character more than a predetermined number of times.

4. An optical character reading system as defined in claim 1, wherein said plurality of recognitions are provided during a single movement of said sensor past said character pattern.

5. An optical character reading system in which a character pattern is scanned by a sensor composed of photoelectric elements to recognize said character pattern comprising:
scanner means for scanning said character pattern a plurality of times in a single sweep of said scanner past said character pattern, said scanner means including an optical system, a single sensor and a control and binary-coding circuit;
a line characteristics extracting circuit coupled to an output of said binary-coding circuit;
a partial characteristics extracting circuit coupled to an output of said line characteristics extracting circuit;
a recognition process circuit having an input coupled to an output of said partial characteristics extracting circuit;
a recognition results detecting circuit having an input coupled to an output of said recognition process circuit, a final single recognition result, upon each character being optically recognized a plurality of times at different relative positions of said sensor and character pattern in a single recognition operation, being produced at an output of said recognition results detecting circuit; and a character area detecting circuit having an input coupled to said output of said control and binary-coding circuit, outputs of said character area detecting circuit being used to control operations of said line characteristics extracting circuit and said recognition results detecting circuit.

6. The optical character reading system of claim 5 wherein said line characteristics extracting circuit comprises a read-only memory.

7. The optical character reading system of claim 6 wherein said partial characteristics extracting circuit comprises a read-only memory having first address inputs coupled to outputs of said line characteristics extracting circuit and a register having inputs coupled to outputs of said read-only memory, outputs of said register being coupled to second address inputs of said read-only memory of said partial characteristics extracting circuit.

8. The optical character reading system of claim 7 wherein said recognition process circuit comprises a read-only memory having first address inputs coupled to outputs of said register of said partial characteristics extracting circuit and a register, said register having inputs coupled to outputs of said read-only memory of said recognition process circuit and having outputs coupled to second address inputs of said read-only memory of said recognition process circuit.

9. The optical character reading system of claim 8 wherein said recognition results detecting circuit comprises a microprocessor.

10. The optical character reading system of any one of claims 5-9 wherein said character area detector comprises a plurality of OR gates having one input of each gate coupled to receive a single line output signal from said control and binary-coding circuit, a register, and a read-only memory, each input of said register being coupled to a corresponding output of one of said OR gates and outputs of said register being coupled to address inputs of said read-only memory and to corresponding second inputs of each of said corresponding OR gates.

* * * * *